United States Patent
Bhatnagar et al.

(10) Patent No.: US 9,330,048 B1
(45) Date of Patent: May 3, 2016

(54) BALANCING RESPONSE TIMES FOR SYNCHRONOUS I/O REQUESTS HAVING DIFFERENT PRIORITIES

(71) Applicants: Gaurav Mukul Bhatnagar, Bangalore (IN); Mark J. Halstead, Holliston, MA (US); Prakash Venkatanarayanan, Bangalore (IN); Sandeep Chandrashekhara, Bangalore (IN)

(72) Inventors: Gaurav Mukul Bhatnagar, Bangalore (IN); Mark J. Halstead, Holliston, MA (US); Prakash Venkatanarayanan, Bangalore (IN); Sandeep Chandrashekhara, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/751,307

(22) Filed: Jan. 28, 2013

(51) Int. Cl.
| | |
|---|---|
| *G06F 3/00* | (2006.01) |
| *G06F 13/00* | (2006.01) |
| *G06F 5/00* | (2006.01) |
| *G06F 15/173* | (2006.01) |
| *G06F 15/16* | (2006.01) |
| *G01R 31/08* | (2006.01) |
| *G06F 13/42* | (2006.01) |

(52) U.S. Cl.
CPC .................................. *G06F 13/423* (2013.01)

(58) Field of Classification Search
CPC . H04L 43/0817; H04L 12/2602; H04L 29/06; H04L 47/10; H04L 47/30; H04L 29/08072; H04L 63/20; H04L 65/403; H04L 51/046; H04L 63/0227; H04L 63/10; H04L 63/126; H04L 63/166; H04L 1/0001; H04L 1/1854; H04L 1/1887; H04L 63/1458; H04L 1/20; H04L 43/08; G06F 13/385; G06F 11/3485; G06F 11/349; G06F 13/28; G06F 3/0659; G06F 3/0611; G06F 3/0613; G06F 3/0656; G06F 3/06; G06F 17/30867; G06F 17/30174; G06F 12/122; G06F 17/30516; G06F 13/423
USPC ..................... 710/15, 18, 29, 33, 39, 61, 107; 709/229; 713/340; 370/230, 252; 345/535; 726/9
See application file for complete search history.

(56) References Cited

U.S. PATENT DOCUMENTS

| | | | |
|---|---|---|---|
| 6,199,127 B1 * | 3/2001 | Ajanovic ........................ 710/100 |
| 6,784,890 B1 * | 8/2004 | Bergeson et al. ............. 345/535 |

(Continued)

OTHER PUBLICATIONS

U.S. Appl. No. 13/338,719, filed Dec. 28, 2011, LeCrone et al.

(Continued)

*Primary Examiner* — Farley Abad
*Assistant Examiner* — Henry Yu
(74) *Attorney, Agent, or Firm* — Muirhead and Saturnelli, LLC

(57) ABSTRACT

A computing environment, such as an data mirroring or replication storage system, may need to process synchronous I/O requests having different priorities in addition to handling I/O requests on the basis of synchronous or asynchronous groupings. The system described herein provides a data storage system that addresses issues involving efficient balancing of response times for servicing synchronous I/O requests having different priorities. Accordingly, the system described herein provides for maintaining an optimal response time for the host-synchronous I/O requests and the optimal throughput of non-host-synchronous I/O requests using a host-synchronous request time window within which processing of non-host-synchronous I/O requests is throttled. The host-synchronous request time window may be selected to enable the optimal response time for the host-synchronous I/O and also to minimize the impact on the overall throughput of the I/O processor of the storage device.

21 Claims, 10 Drawing Sheets

(56) References Cited

U.S. PATENT DOCUMENTS

| | | |
|---|---|---|
| 6,886,164 B2 | 4/2005 | Meiri |
| 6,954,835 B1 | 10/2005 | LeCrone et al. |
| 7,054,883 B2 | 5/2006 | Meiri et al. |
| 7,114,033 B2 | 9/2006 | Longinov et al. |
| 7,475,207 B2 | 1/2009 | Bromling et al. |
| 7,613,890 B1 | 11/2009 | Meiri |
| 7,685,129 B1 | 3/2010 | LeCrone et al. |
| 7,702,871 B1 | 4/2010 | Arnon et al. |
| 7,707,186 B2 | 4/2010 | LeCrone et al. |
| 7,757,013 B1 | 7/2010 | Lawson et al. |
| 7,779,291 B2 | 8/2010 | Yoder et al. |
| 8,185,708 B2 | 5/2012 | LeCrone et al. |
| 8,190,948 B1 | 5/2012 | Marshak et al. |
| 8,261,029 B1 | 9/2012 | Marshak et al. |
| 8,335,899 B1 | 12/2012 | Meiri et al. |
| 8,429,282 B1* | 4/2013 | Ahuja et al. .................. 709/229 |
| 8,631,149 B2* | 1/2014 | Kamath ................. H04L 47/32 709/233 |
| 2004/0110507 A1* | 6/2004 | Ramakrishnan et al. ...... 455/445 |
| 2008/0133750 A1* | 6/2008 | Grabarnik ........... H04L 12/2602 709/224 |
| 2009/0063884 A1* | 3/2009 | Weekly ......................... 713/340 |
| 2010/0302939 A1* | 12/2010 | Denis ............................ 370/230 |
| 2011/0307948 A1* | 12/2011 | Ranjan et al. ..................... 726/9 |
| 2013/0016624 A1* | 1/2013 | Li et al. ......................... 370/252 |

OTHER PUBLICATIONS

EMC Corporation, "Enginuity 5876 New Features for the Symmetrix VMAX Family Storage Systems: A detailed review for Open Systems environments," White paper h10497, May 2012, 15 pp.

* cited by examiner

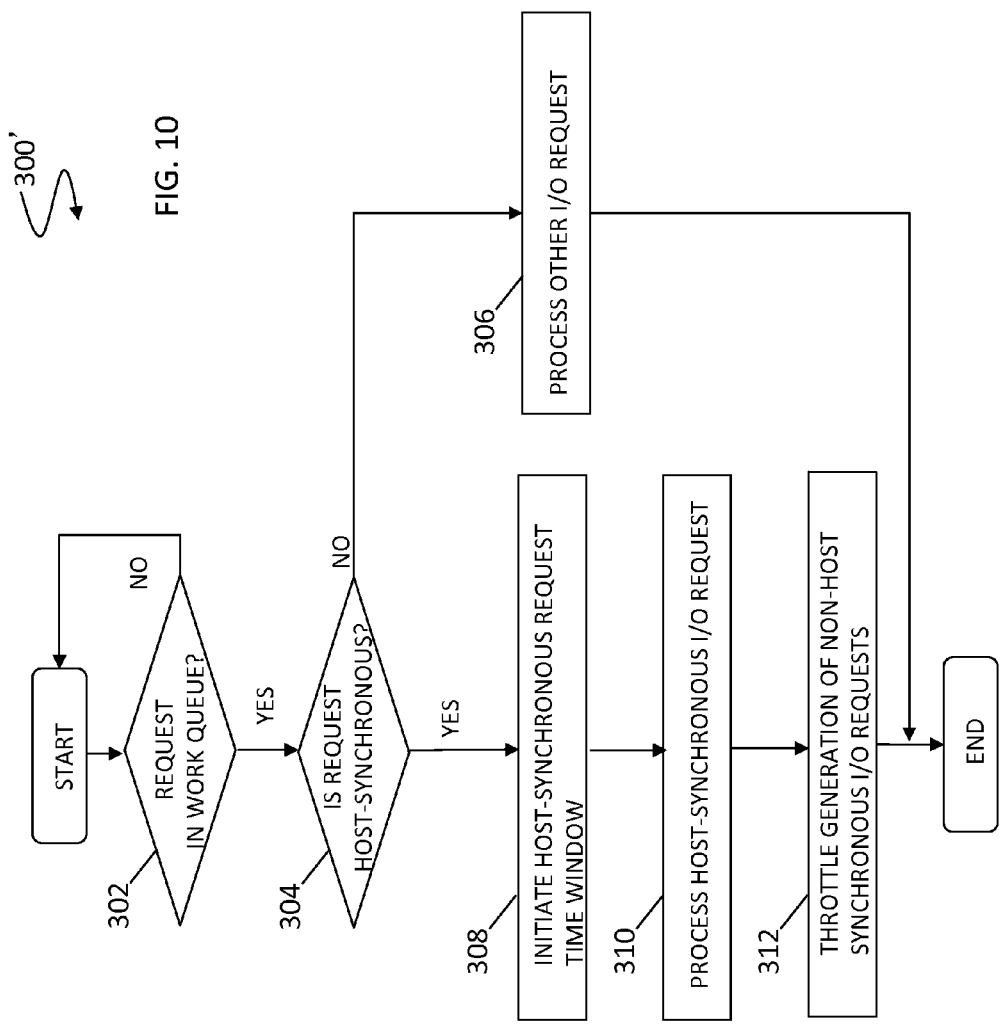

BALANCING RESPONSE TIMES FOR SYNCHRONOUS I/O REQUESTS HAVING DIFFERENT PRIORITIES

TECHNICAL FIELD

This application relates to computer storage, and more particularly to the field of processing input/output (I/O) requests among storage devices.

BACKGROUND OF THE INVENTION

Host processor systems may store and retrieve data using a storage device containing a plurality of host interface units (host adapters), disk drives, and disk interface units (disk adapters). Such storage devices are provided, for example, by EMC Corporation of Hopkinton, Mass. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by a Remote Data Facility (RDF) product, such as a Symmetrix Remote Data Facility (SRDF) product, provided by EMC Corporation of Hopkinton, Mass. With RDF, a first storage device, denoted as the "primary storage device" (or "R1"), is coupled to the host. One or more other storage devices, called "secondary storage devices" (or "R2"), receive copies of the data that is written to the primary storage device by the host. The host may interact directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with a remote adapter (RA) provided at each of the storage devices. In other embodiments, it is noted that an RDF system may be active/active, in which each of the storage devices is accessible to one or more hosts for data writes (as R1 devices) and the other of the storage devices may, in each case, serve as an R2 device.

Data transfer among storage devices, including transfers for data replication or mirroring functions, may involve various data synchronization operation modes and techniques to provide reliable protection copies of data among a source or local site and a destination or remote site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired.

For both synchronous and asynchronous transfers, it may be desirable to maintain a proper ordering of writes such that any errors or failures that occur during data transfer may be properly identified and addressed such that, for example, incomplete data writes be reversed or rolled back to a consistent data state as necessary. Reference is made, for example, to U.S. Pat. No. 7,475,207 to Bromling et al. entitled "Maintaining Write Order Fidelity on a Multi-Writer System," which is incorporated herein by reference, that discusses features for maintaining write order fidelity (WOF) in an active/active system in which a plurality of directors (i.e. controllers and/or access nodes) at geographically separate sites can concurrently read and/or write data in a distributed data system.

For further discussions of data ordering and other techniques used for synchronous and asynchronous data replication processing in various types of systems, including types of RDF systems and products produced by EMC Corporation of Hopkinton, Mass., reference is made to, for example, U.S. Pat. No. 8,335,899 to Meiri et al., entitled "Active/Active Remote Synchronous Mirroring," U.S. Pat. No. 8,185,708 to LeCrone et al., entitled "Host Implementation of Triangular Asynchronous Replication," U.S. Pat. No. 7,779,291 to Yoder et al., entitled "Four Site Triangular Asynchronous Replication," U.S. Pat. No. 7,613,890 to Meiri, entitled "Consistent Replication Across Multiple Storage Devices," and U.S. Pat. No. 7,054,883 to Meiri et al., entitled "Virtual Ordered Writes for Multiple Storage Devices," which are all incorporated herein by reference.

A system operating with RDF techniques may use combinations of the above-noted operation modes. In implementations using, for example, both synchronous and asynchronous RDF operation modes, problems may occur in determining priority of writes. For example, a weighting system may be used to manage workload according to a polling mechanism for selecting an RDF group. An RDF group may be assigned a certain weight according to the length of its local RDF workload queue, which is an evaluation proportional to the workload of that group. Selecting the group for the next write may done in a pseudo-random fashion but controlled such that the tendency is to select a group that has a higher weight. For an example of managing workload according to a weighting system based on queue length, see U.S. Pat. No. 6,886,164 to Meiri, entitled "Selection of a Resource in a Distributed Computer System," which is incorporated herein by reference. Because of the latency issues, priority may be given to synchronous transfers over asynchronous transfers using the weighting system. However, for an RDF system in which both synchronous and asynchronous transfers occur using the same RA, a simple or static weighting system may not efficiently service asynchronous transfers if synchronous transfers are repeatedly received and given priority.

U.S. Pat. No. 8,261,029 to Marshak et al., entitled "Dynamic Balancing of Writes Between Multiple Storage Devices," which is incorporated herein by reference, discloses a system for dynamically balancing writes (and/or other input/output (I/O) requests) between multiple storage devices in which RDF groups may be assigned weights according to a dynamic priority parameter. The dynamic priority parameter provides the ability to control the weight of an asynchronous RDF group compared to that of a synchronous RDF group. For a mix of asynchronous RDF groups and synchronous RDF groups, a dynamic balance of write priorities between the two group types may be obtained by the system of Marshak et al.

It is noted that a computing environment, such as an RDF system, may need to process synchronous I/O requests having different priorities in addition to handling I/O requests on the basis of synchronous or asynchronous groupings. For example, for a host coupled to an RDF system, host synchronous I/O requests may have a higher priority than non-host synchronous I/O requests. Non-host synchronous I/O requests may include, for example, internal synchronous I/O requests of the RDF system and/or other types of non-host synchronous I/O requests that are not generated by the host. In a simple model for servicing synchronous I/O requests, the synchronous I/O requests may be serviced on a first-come-first-served basis. However, since host-synchronous (high priority) I/O requests may be driven by an application on the host, such requests may be sporadic in nature. In the case of two (or more) host-synchronous (higher priority) I/O requests, that may in some cases correspond to one another, intervening non-host synchronous (lower priority) I/O requests may be generated between the two or more host-synchronous (higher priority) I/O requests. Such intervening non-host synchronous I/O requests may undesirably tend to congest the computer network and hold resources necessary for execution of the higher priority request for periods of time, causing resource starvation for the higher priority requests and impacting host response times.

Accordingly, it would be desirable to provide a data storage system that addresses issues noted above involving efficient balancing of response times for servicing synchronous I/O requests having different priorities.

SUMMARY OF THE INVENTION

According to the system described herein, a method of balancing response times of a system includes receiving a first-type synchronous I/O request from a host. After receiving the first-type synchronous I/O request, a time window is initiated. In response to receiving at least one other first-type synchronous I/O request from the host during the time window, the at least one other first-type synchronous I/O request is processed. The method further includes throttling processing of a second-type request that is different from the at least one other first-type synchronous I/O request received during the time window. Throttling the processing of the second-type request may include limiting processing resources available to process the second-type request and/or limiting generation of the second-type request. The second-type request may be a synchronous I/O request having a different priority than the first-type synchronous I/O request. A length of the time window may be determined automatically based on at least one condition and/or may be fixed by a user. The at least one condition may include a network condition, a time of day, and/or an I/O request pattern.

According further to the system described herein, a non-transitory computer-readable medium stores software for balancing response times of a system. The software includes executable code that receives a first-type synchronous I/O request from a host. Executable code is provided that, after receiving the first-type synchronous I/O request, initiates a time window. Executable code is provided that, in response to receiving at least one other first-type synchronous I/O request from the host during the time window, processes the at least one other first-type synchronous I/O request. Executable code is provided that throttles processing of a second-type request that is different from the at least one other first-type synchronous I/O request received during the time window. The executable code that throttles the processing of the second-type request may include executable code that limits processing resources available to process the second-type request and/or executable code that throttles the processing of the second-type request includes executable code that limits generation of the second-type request. The second-type request may be a synchronous I/O request having a different priority than the host-synchronous I/O request. Executable code may be provided that determines a length of the time window and may include executable code that automatically determines the length based on at least one condition and/or executable code that provides an interface that receives input by a user for the length of the time window. The at least one condition may include a network condition, a time of day, and/or an I/O request pattern.

According further to the system described herein, a system for balancing response times of a storage system includes at least one storage device that receives a first-type synchronous I/O request from a host. A throttle device is provided that, after receiving the first-type synchronous I/O request, initiates a time window, wherein, in response to receiving at least one other first-type synchronous I/O request from the host during the time window. The throttle device enables processing of the at least one other first-type synchronous I/O request by the at least one storage device, and wherein the throttle device throttles processing of a second-type request that is different from the at least one other first-type synchronous I/O request received during the time window. At least one remote storage device may be provided that is coupled to the at least one storage device and that provides data replication capability. The second-type request may be a synchronous I/O request having a different priority than the first-type synchronous I/O request, and wherein throttling the processing of the second-type request includes (i) limiting processing resources available to process the second-type request and/or (ii) limiting generation of the second-type request. The throttle device may determine a length of the time window based on at least one condition.

BRIEF DESCRIPTION OF THE DRAWINGS

FIG. 10 is a flow diagram showing processing like that of flow diagram in FIG. 7, but with an additional processing step according to another embodiment of the system described herein.

DETAILED DESCRIPTION OF VARIOUS EMBODIMENTS

Figure 1:
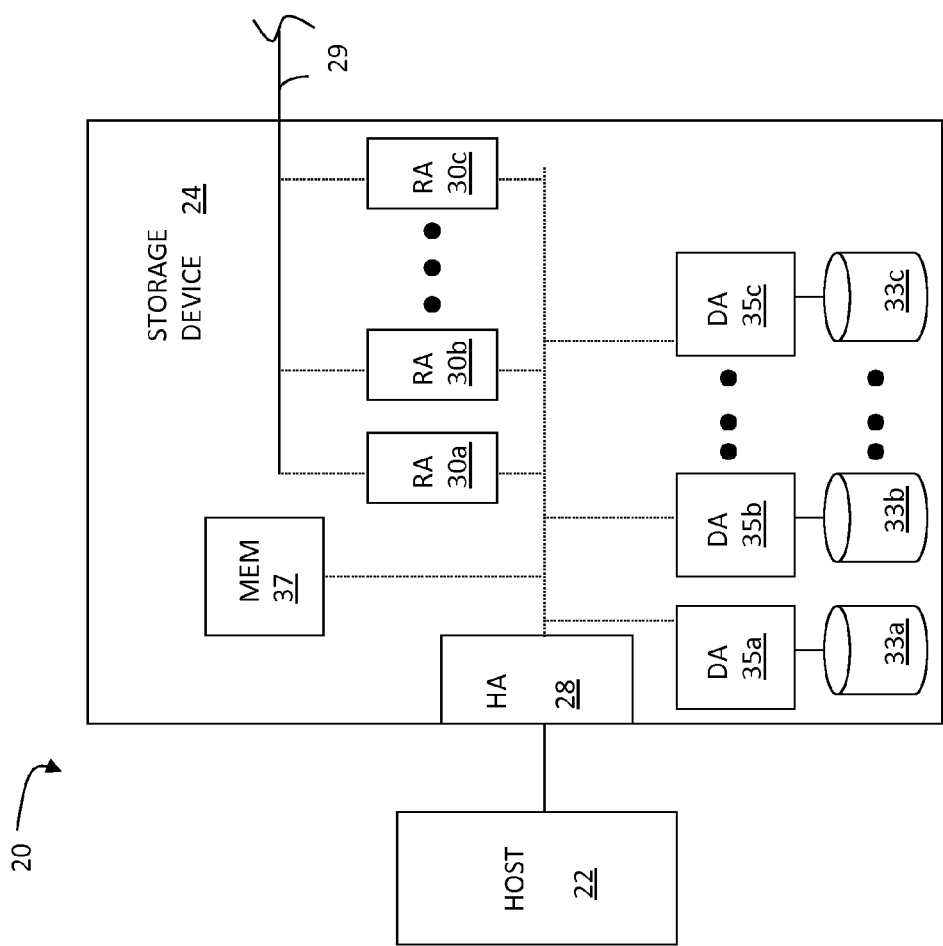
FIG. 1 is a schematic diagram showing a host and a storage device used in connection with an embodiment of the system described herein.

FIG. 1 is a schematic diagram 20 showing a relationship between a host 22 and a storage device 24. The host 22 reads and writes data from and to the storage device 24 via a host adapter (HA) 28, which facilitates the interface between the host 22 and the storage device 24. Although the diagram 20 only shows one host 22 and one HA 28, it will be appreciated by one of ordinary skill in the art that multiple HA's may be used and that one or more HA's may have one or more hosts coupled thereto.

The storage device 24 may include via a link 29, such as an RDF link, to cause data to transmitted to another device, such as another storage device (see storage device 26 in FIG. 3) that may be similar to, different from, the storage device 24. For example, data may be transmitted from the storage device to another storage device in connection with data mirroring operations. Although only the one link 29 is shown, it is possible to have additional links. In addition, the link 29 may be provided using a direct connection (wired, over-the-air, or some combination thereof), a network (such as the Internet), or any other appropriate means for conveying data. Note that there may be a time delay between the transfer of data from the local storage device 24 to the another storage device, so that the other storage device may, at certain points in time, contain data that is not identical to the data on the storage device 24.

The storage device 24 may include a first plurality of remote adapter units (RA's) 30a, 30b, 30c. The RA's 30a-30c may be coupled to the link 29 and are similar to the host adapter 28, but are used to transfer data between storage devices. The software used in connection with the RA's 30a-30c is discussed in more detail hereinafter.

The storage device 24 may include one or more disks, each containing a different portion of data stored on the storage device 24. FIG. 1 shows the storage device 24 including a plurality of disks 33a, 33b, 33c. The RDF functionality described herein may be applied so that the data for at least a portion of the disks 33a-33c of the storage device 24 is copied, using RDF, to at least a portion of the disks of another storage device 26. It is possible that other data of the storage devices 24, 26 is not copied between the storage devices 24, 26, and thus is not identical.

Each of the disks 33a-33c is coupled to a corresponding disk adapter unit (DA) 35a, 35b, 35c that provides data to a corresponding one of the disks 33a-33c and receives data from a corresponding one of the disks 33a-33c. An internal data path exists between the DA's 35a-35c, the HA 28 and the RA's 30a-30c of the local storage device 24. Note that, in other embodiments, it is possible for more than one disk to be serviced by a DA and that it is possible for more than one DA to service a disk.

The storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c.

The storage space in the storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b.

Figure 2:
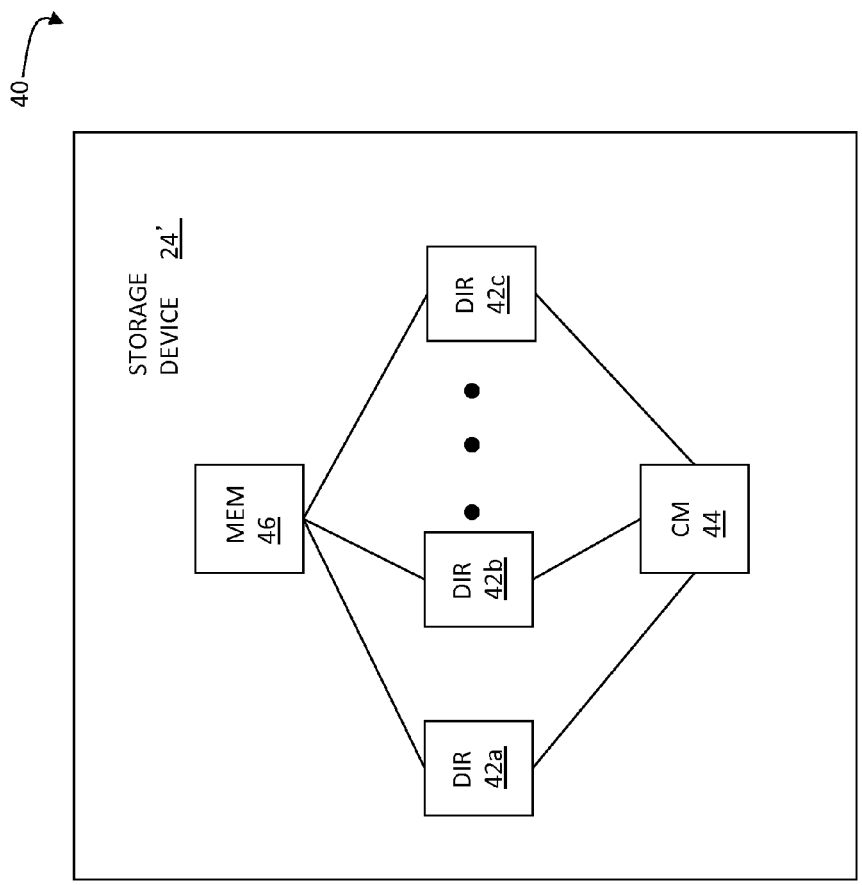
FIG. 2 is a schematic diagram showing a storage device, memory, a plurality of directors, and a communication module used in connection with an embodiment of the system described herein.

FIG. 2 is a schematic diagram 40 illustrating an embodiment where a storage device 24', which is like the storage device 24, includes a plurality of directors 42a-42c that are coupled to a memory 46, like the memory 37 of the storage device 24. Each of the directors 42a-42c may represent an HA, DA, and/or RA like the HA 28, the DA's 35a-35c, 36a-36c, and/or the RA's 30a-30c, 32a-32c of the storage device. In an embodiment disclosed herein, there may be up to sixteen directors coupled to the memory 46. Of course, for other embodiments, there may be a higher or lower maximum number of directors that may be used.

The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 46. The CM 44 may be implemented using conventional MUX/router technology where a sending one of the directors 42a-42c provides an appropriate address to cause a message and/or data to be received by an intended receiving one of the directors 42a-42c. In addition, a sending one of the directors 42a-42c may be able to broadcast a message to all of the other directors 42a-42c at the same time.

In some embodiments, one or more of the directors 42a-42c may have multiple processor systems thereon and thus may be able to perform functions for multiple directors. In some embodiments, at least one of the directors 42a-42c having multiple processor systems thereon may simultaneously perform the functions of at least two different types of directors (e.g., an HA and a DA). Furthermore, in some embodiments, at least one of the directors 42a-42c having multiple processor systems thereon may simultaneously perform the functions of at one types of director and perform other processing with the other processing system.

Figure 3:
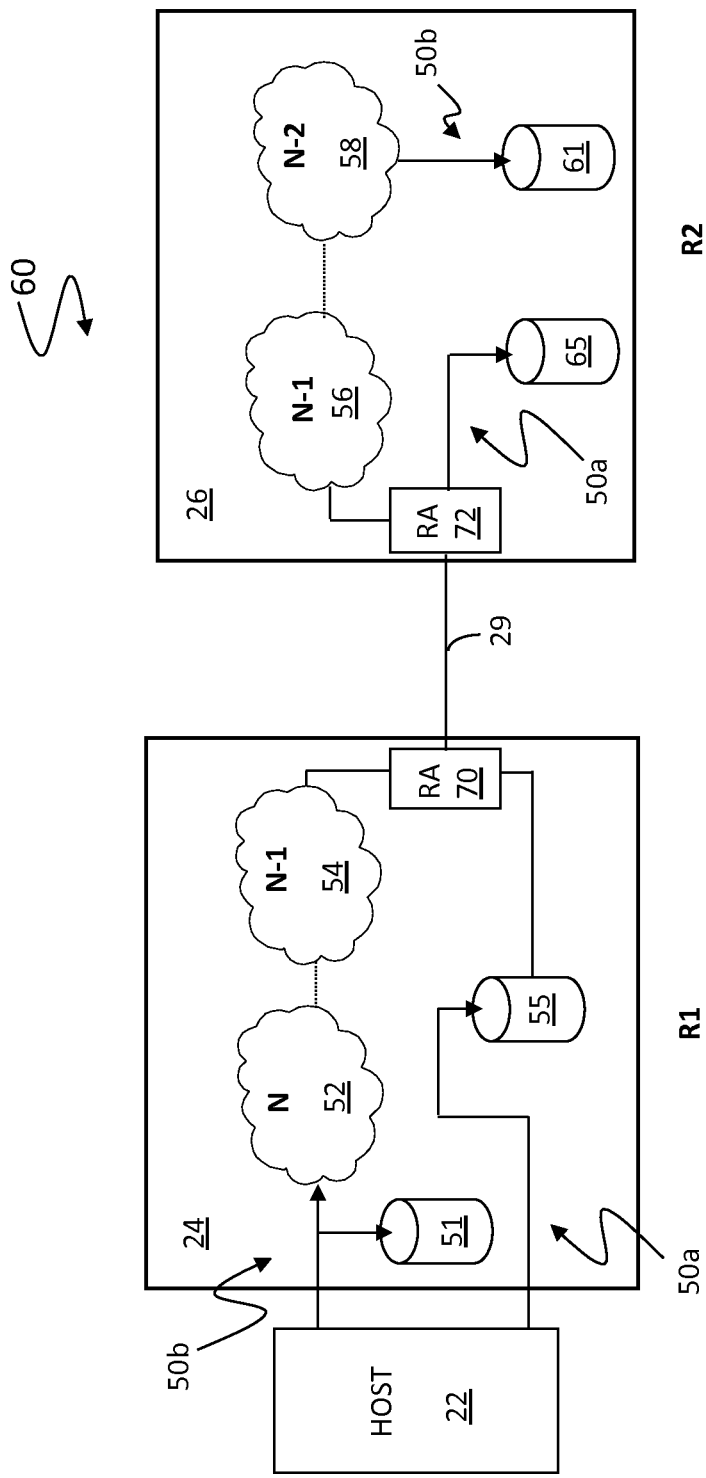
FIG. 3 is a schematic diagram showing an flow of data between a host, a local storage device, and a remote storage device in connection with an embodiment of the system described herein.

FIG. 3 is a schematic illustration 60 showing data paths 50a, 50b from the host 22 to the local storage device 24 and the remote storage device 26. The data path 50a illustrates a synchronous mode data transfer and the data path 50b illustrates an asynchronous mode data transfer in which data is transferred in batches or chunks, as further described herein. As illustrated, in an embodiment, the data transfers may be conducted using the same RA 70 at the local storage device 24 and/or the same RA 72 at the remote storage device 26. In connection with various embodiments herein, the system described herein addresses issues that may occur in determining an efficient order for priority of writes between, for example, SRDF synchronous (SRDF/S) and asynchronous (SRDF/A) transfers, particularly when data transfer requests for synchronous SRDF groups and asynchronous SRDF groups are being serviced on the same RA and for efficiently addressing problems involving rapidly changing queue lengths when data is transferred in chunks. As further discussed elsewhere herein, the system described herein may further be used in connection with balancing response times for synchronous transfers having different priorities.

Providing an RDF mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the RDF mapping causes modified data to be transferred from the local storage device 24 to the remote storage device 26 using the RA's, 30a-30c, 32a-32c and the RDF link 29. In steady state operation, the logical device on the remote storage device 26 contains data that is identical to the data of the logical device on the local storage device 24. The logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume. The system described herein may be implemented using software, hardware, and/or a combination of software and hardware where software may be stored in an appropriate storage medium and executed by one or more processors.

For the synchronous mode data path 50a, data written from the host 22 to the local storage device 24 may be stored locally, for example on data volume 55 of the local storage device 24. After data is written from the host 22 to the local storage device 24, the data is transferred from the local storage device 24 to a remote storage device 26 using RDF. Receipt by the remote storage device 26, for example on data volume 65, is then acknowledged to the local storage device 24 which then provides an acknowledge back to the host 22 for the initial write.

For the asynchronous mode data path 50b, data written from the host 22 to the local storage device 24 may be stored locally, as illustrated by the data volume 51 of the local storage device 24. The data that is written by the host 22 to the local storage device 24 is also maintained by the local storage device 24 in connection with being sent by the local storage device 24 to the remote storage device 26 via the link 29. Note that although separate data volumes are illustrated for the synchronous and asynchronous mode data paths, in some embodiments it is possible that the same data volume is used for storage of data in each transfer mode.

In an embodiment of the asynchronous mode data path 50b, each data write by the host 22 (of, for example a record, a plurality of records, a track, etc.) is assigned a sequence number. The sequence number may be provided in an appropriate data field associated with the write. In the figure, the writes by the host 22 are shown as being assigned sequence number N. All of the writes performed by the host 22 that are assigned sequence number N may be collected in a single chunk of data 52. The chunk 52 represents a plurality of separate writes by the host 22 that occur at approximately the same time.

Generally, the local storage device 24 accumulates chunks of one sequence number while transmitting a previously accumulated chunk (having the previous sequence number) to the remote storage device 26. Thus, while the local storage device 24 is accumulating writes from the host 22 that are assigned sequence number N, the writes that occurred for the previous sequence number (N−1) are transmitted by the local storage device 24 to the remote storage device 26 via the link 29. A chunk 54 represents writes from the host 22 that were assigned the sequence number N−1 that have not been transmitted yet to the remote storage device 26.

The remote storage device 26 receives the data from the chunk 54 corresponding to writes assigned a sequence number N−1 and constructs a new chunk 56 of host writes having sequence number N−1. The data may be transmitted using appropriate RDF protocol that acknowledges data sent across the link 29. When the remote storage device 26 has received all of the data from the chunk 54, the local storage device 24 sends a commit message to the remote storage device 26 to commit all the data assigned the N−1 sequence number corresponding to the chunk 56. Generally, once a chunk corresponding to a particular sequence number is committed, that chunk may be written to the logical volume at the remote storage device. This is illustrated with a chunk 58 corresponding to writes assigned sequence number N−2 (i.e., two before the current sequence number being used in connection with writes by the host 22 to the local storage device 26). The chunk 58 is shown as being written to a data volume 61 representing disk storage for the remote storage device 26. Thus, the remote storage device 26 is receiving and accumulating the chunk 56 corresponding to sequence number N−1 while the chunk 58 corresponding to the previous sequence number (N−2) is being written to disk storage of the remote storage device 26 illustrated by the data volume 61. In some embodiments, the data for the chunk 58 is marked for write (but not necessarily written immediately), while the data for the chunk 56 is not.

Thus, in operation, the host 22 writes data to the local storage device 24 that is stored locally in the data volume 51 and is accumulated in the chunk 52. Once all of the data for a particular sequence number has been accumulated the local storage device 24 increments the sequence number, in a process termed, for example, a cycle switch. Data from the chunk 54 corresponding to one less than the current sequence number is transferred from the local storage device 24 to the remote storage device 26 via the link 29. The chunk 58 corresponds to data for a sequence number that was committed by the local storage device 24 sending a message to the remote storage device 26. Data from the chunk 58 is written to disk storage of the remote storage device 26. For further discussion of handling data writes to a storage device including processes of maintaining circular linked lists of pointers to cache slots and hash tables to provide correlation between cache slots, see U.S. Pat. No. 7,114,033 to Longinov, et al., which is incorporated herein by reference.

The system described herein may be used in connection with data mirroring processes and data migration processes, including the use of data encryption processes in connection with data mirroring or migration. Reference is made, for example, to U.S. Pat. No. 6,954,835 to LeCrone et al., entitled "Intercepting Control of a Host I/O Process," U.S. Pat. No. 7,685,129 to LeCrone et al., entitled "Dynamic Data Set Migration," and U.S. Pat. No. 7,707,186 to LeCrone et al., entitled "Method and Apparatus for Data Set Migration," which are all incorporated herein by reference.

The system described herein may be used in connection with a virtualized environment in which virtual components may provide logical control and management of data storage in a data center. A converged infrastructure platform may be used that provides an integrated package of components to provide network, compute and/or storage services for use in the virtualized environment. One example of a converged infrastructure platform is a Vblock product produced by VCE Company, LLC of Richardson, Tex. Other suitable types of converged infrastructure platform products may include EMC Corporation's VMAX and/or VSPEX products, and may include EMC Corporation's Enginuity operating system. Management of an appropriate type of converged infrastructure product may be provided by an appropriate software element. For example, EMC's Ionix Unified Infrastructure Manager (UIM) may be integrated with a converged infrastructure product and provide a management console for management of the converged infrastructure product.

As discussed elsewhere herein, a system operating with RDF techniques may use combinations of operation modes. In implementations using, for example, both synchronous and asynchronous RDF operation modes, problems may occur in determining priority of writes. Static weighting systems, for example based on workload queue length, see, e.g., U.S. Pat. No. 6,886,164 to Meiri, entitled "Selection of a Resource in a Distributed Computer System," which is incorporated herein by reference, are known. However, for an RDF system in which both synchronous and asynchronous transfers occur using the same RA, a static weighting system may not efficiently service asynchronous transfers if synchronous transfers are repeatedly received and given priority. U.S. Pat. No. 8,261,029 to Marshak et al., entitled "Dynamic Balancing of Writes Between Multiple Storage Devices," which is incorporated herein by reference, discloses a system for dynamically balancing writes (and/or other input/output (I/O) requests) between multiple storage devices in which RDF groups may be assigned weights according to a dynamic priority parameter. The dynamic priority parameter provides the ability to control the weight of an asynchronous RDF group compared to that of a synchronous RDF group. For a mix of asynchronous RDF groups and synchronous RDF groups, a dynamic balance of write priorities between the two group types may be obtained by the system of Marshak et al.

Figure 4:
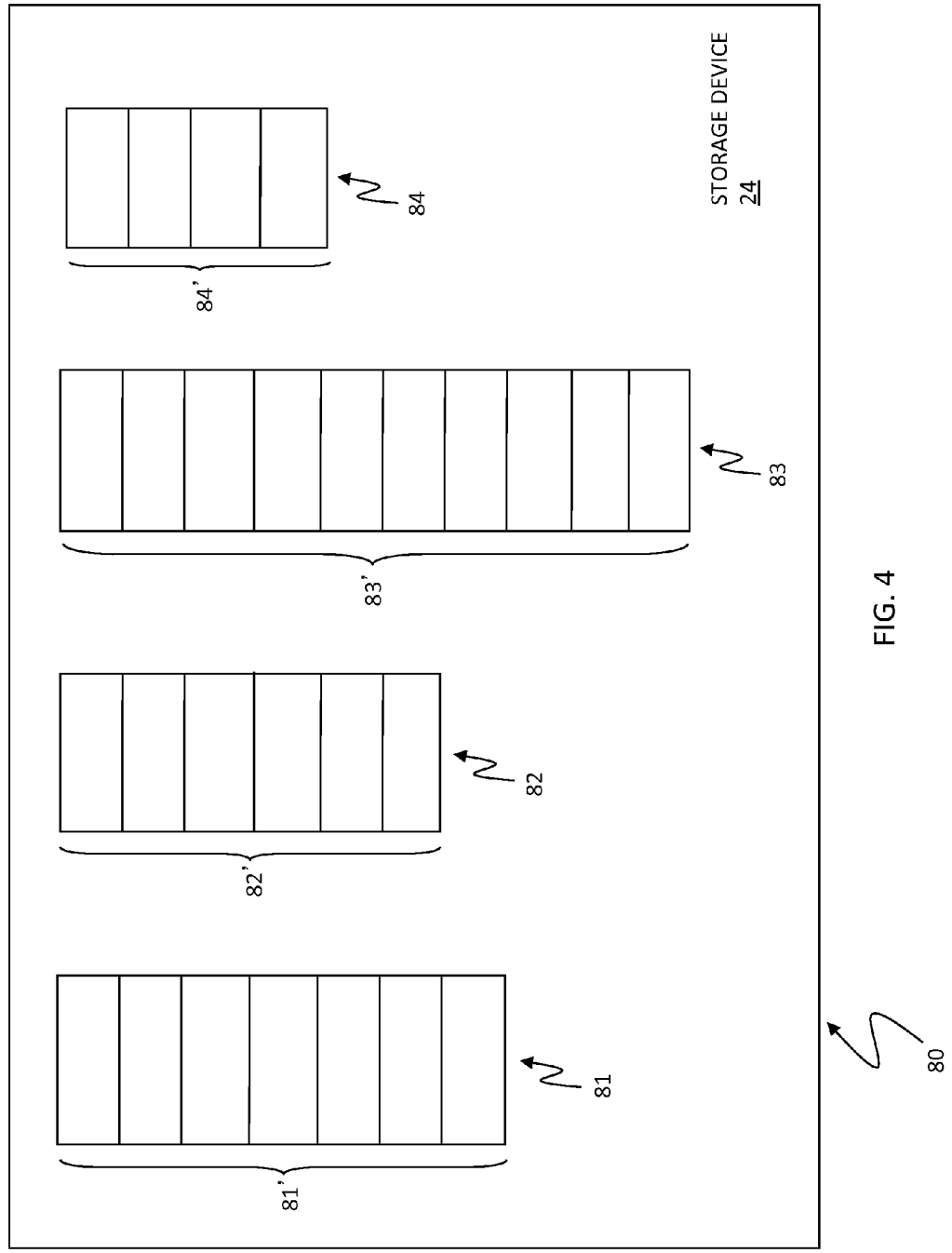
FIG. 4 is a schematic diagram of a system showing workload queues corresponding to jobs of RDF groups awaiting data transfer to the remote storage device.

FIG. 4 is a schematic diagram of a system 80 showing workload queues 81, 82, 83, 84 corresponding to jobs of RDF groups awaiting data transfer to the remote storage device 26. One or more of the workload queues 81-84 may be maintained for transmission of the inactive cycle data (for example, the data chunk 54) in connection with asynchronous transfers, while other ones of the workload queues 81-84 may be maintained for other types of RDF transfer, such as a synchronous transfer as illustrated by the path 50a of FIG. 3. The workload queues 81-84 may be stored in global memory 37, in a local memory of the RA 70 and/or in another location. In various embodiments, the workload queues 81-84 may correspond to RDF groups of different transfer types, including synchronous, asynchronous, semi-synchronous (in which case the data is written from the host to the primary storage device which acknowledges the write immediately and then, at the same time, begins the process of transferring the data to the secondary storage device) and/or other transfer modes. The workload queues 81-84 each have a certain queue length 81', 82', 83', 84' of data transfer jobs awaiting execution. Of course, the queue lengths 81'-84' may be other than those specifically shown. As further discussed elsewhere herein, a processor of the RA 70 may control selection processing of a queue according to selection and/or execution algorithms along with handling transmission of the selected data.

The system described herein may be used in connection with the above-noted selection and weighting algorithms. It is noted, however, that a computing environment, such as an RDF system, may need to process synchronous I/O requests having different priorities in addition to handling I/O requests on the basis of synchronous or asynchronous groupings. The system described herein provides a data storage system that addresses issues involving efficient balancing of response times for servicing synchronous I/O requests having different priorities.

Figure 5:
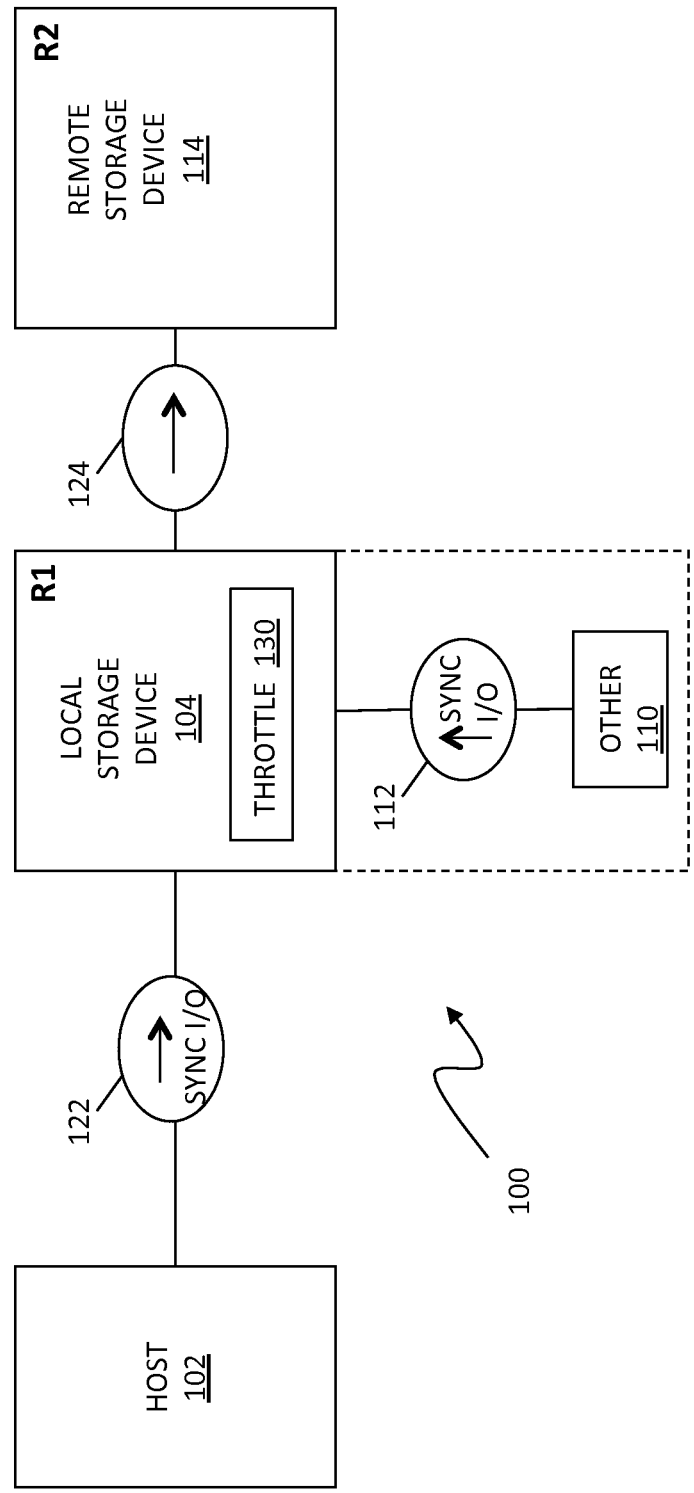
FIG. 5 is a schematic diagram illustrating a system that includes a host, a local storage device, and a remote storage device that may be used in accordance with an throttling non-host-synchronous I/O requests according to an embodiment of the system described herein.

FIG. 5 is a schematic diagram illustrating a system 100 that includes a host 102, a local storage device 104, and a remote storage device 114 that may be used in accordance with an throttling non-host-synchronous I/O requests according to an embodiment of the system described herein. In an embodiment, the devices 104, 114 may be R1, R2 volumes of a system that provides enhanced disaster recovery and data accessibility features. In other embodiments, the system 100 may be an active/active system in which one or more hosts may also access the remote storage device 114, acting as an R1 device in such instance, for data writes and which may, in turn, back-up the data writes to the storage device 104, acting as an R2 device in such instance. In an embodiment herein, the local storage device 104 may represent a storage device that is in relatively close proximity to the host 102 to allow for synchronous I/O request transfers between the host 102 and the local storage device 104.

A host-synchronous I/O request (SYNC I/O) 122 is shown transmitted from the hot 102 to the local storage device 104. The host-synchronous I/O request 122 may be serviced synchronously on the local storage device 104 and in connection with a back-up I/O processing request 124 on the remote storage device 26, for example, in accordance with SRDF processing as further discussed elsewhere herein. In various embodiments, the SRDF processing with the remote storage device 26 may be synchronous and/or asynchronous.

As discussed elsewhere herein, it is noted that a computing environment, such as an RDF system, may need to process synchronous I/O requests having different priorities in addition to handling I/O requests on the basis of synchronous or asynchronous groupings. For example, the host synchronous I/O request 122 may have a higher priority than a non-host-synchronous I/O request 112. The non-host-synchronous I/O request 112 is shown being initiated from another source 110. The other source 110 may include, for example, internal synchronous I/O requests of the RDF system and/or other types of non-host-synchronous I/O requests that are not generated by the host 102. The host-synchronous I/O request 122 may have a high priority; however, since the host-synchronous I/O request 122 may be driven by an application on the host 102, such requests may be sporadic in nature. In the case of two (or more) host-synchronous I/O requests, that may in some cases correspond to one another, the non-host synchronous I/O request may occur in an intervening manner between the two (or more) host-synchronous I/O requests. Such intervening non-host-synchronous I/O requests may undesirably tend to congest the computer network and hold resources necessary for execution of the higher priority request for periods of time, causing resource starvation for the higher priority requests and impacting host response times.

According to the system described herein, an assumption may be made that once there has been a host-synchronous I/O request in the past, there is an increased chance of having another host-synchronous IO in the near future. The "near future" duration of time during which it may be expected that another host-synchronous IO may be received is defined herein as a host-synchronous request time window. Therefore, to allow generation of requests for the host-synchronous I/O request, a throttle mechanism 130 throttles, and/or otherwise limits, the generation and/or servicing of requests for non-host-synchronous I/O requests during the host-synchronous request time window that is initiated by receipt of the host-synchronous I/O request 122. Accordingly, if another host-synchronous I/O request is received by the local storage device 104 during the host-synchronous request time window, the system described herein provides that by throttling non-host-synchronous I/O requests during the time window all the resources needed for the next host-synchronous WO request are available and servicing can be started without any delay. In case the local storage device 104 does not receive any further host-synchronous I/O requests during the host-synchronous request time window, the system described herein may determine that the host-synchronous I/O requests have stopped and the throttle mechanism 130 may proceed to allow resumed handling of the non-host-synchronous requests.

Accordingly, the system described herein provides for maintaining an optimal response time for the host-synchronous I/O requests and the optimal throughput of non-host-synchronous I/O requests using the host-synchronous request time window within which processing of non-host-synchronous I/O requests is throttled. The host-synchronous request time window may be selected to enable the optimal response time for the host-synchronous I/O and also to minimize the impact on the overall throughput of the I/O processor of the storage device, since if the I/O processor waits too long for the next host-synchronous IO, the overall throughput will be affected.

In various embodiments, the host-synchronous request time window may be determined automatically by the system described herein and/or may be a tunable feature that is set by an administrator and/or a user. Further, it is noted that the system may be turned on/off dynamically thereby providing flexibility.

In connection with automated setting of a length of the host-synchronous request time window, in an embodiment, the throttle mechanism 130 may determine the length of the host-synchronous request time window based on an assessment of synchronous I/O requests received from a host over a prior period of time. In an embodiment, the host-synchronous request time window may be set at a specific fixed time value, such as 5 ms. In another embodiment, the system may dynamically determine the length of the host-synchronous request time window. In an embodiment, the system may determine an average of time between synchronous I/O requests over the prior period of time. It is further noted that the length of the host-synchronous request time window may be variable depending on conditions, including based on network conditions, time of day and/or expected data traffic and/or other type of I/O request pattern, among other conditions. In some cases, depending on monitored conditions, a percentage (e.g., 10%) may be added to the average period of time for prior synchronous I/O requests to address expected latencies etc. Additionally, the length of the host-synchronous request time window may be dependent on the type of I/O request received. As a general example, a read request have a different length of the host-synchronous request time window than a write request.

In connection with setting the host-synchronous request time window as a tunable feature, the throttle mechanism 130 may be accessed via an interface that may include a control panel for the host-synchronous request time window. A user in the field may set the host-synchronous request time window to a desired length using the control panel. It is noted that the control panel may also be used as override of an automatic or default setting of the host-synchronous request time window.

Throttling of I/O requests may be performed using known techniques, such as limiting resources available to process particular I/O requests. For example, reference is made to U.S. Pat. No. 7,757,013 to Lawson et al., entitled "Techniques for controlling data storage system performance," which is incorporated by reference. For non-host-synchronous I/O requests generated internally to the storage system, the throttle mechanism 130 may limit or prevent generation of such internal non-host-synchronous I/O requests during the host-synchronous request time window. For other non-host-synchronous I/O requests that may be generated externally to the storage system and received by the storage system, the throttling may include limiting the servicing of the non-host-synchronous I/O requests, for example, by limiting the processing resources available to service the non-host-synchronous I/O requests.

The system described herein offers a number of advantages. For example, the system provides for reducing the response time for the host synchronous I/O requests. Additionally, the system provides that the lower priority I/O requests are not penalized indefinitely. Furthermore, the system provides the flexibility to a user to define the response time window as desired, for example, according to needs of a particular application.

Figure 6:
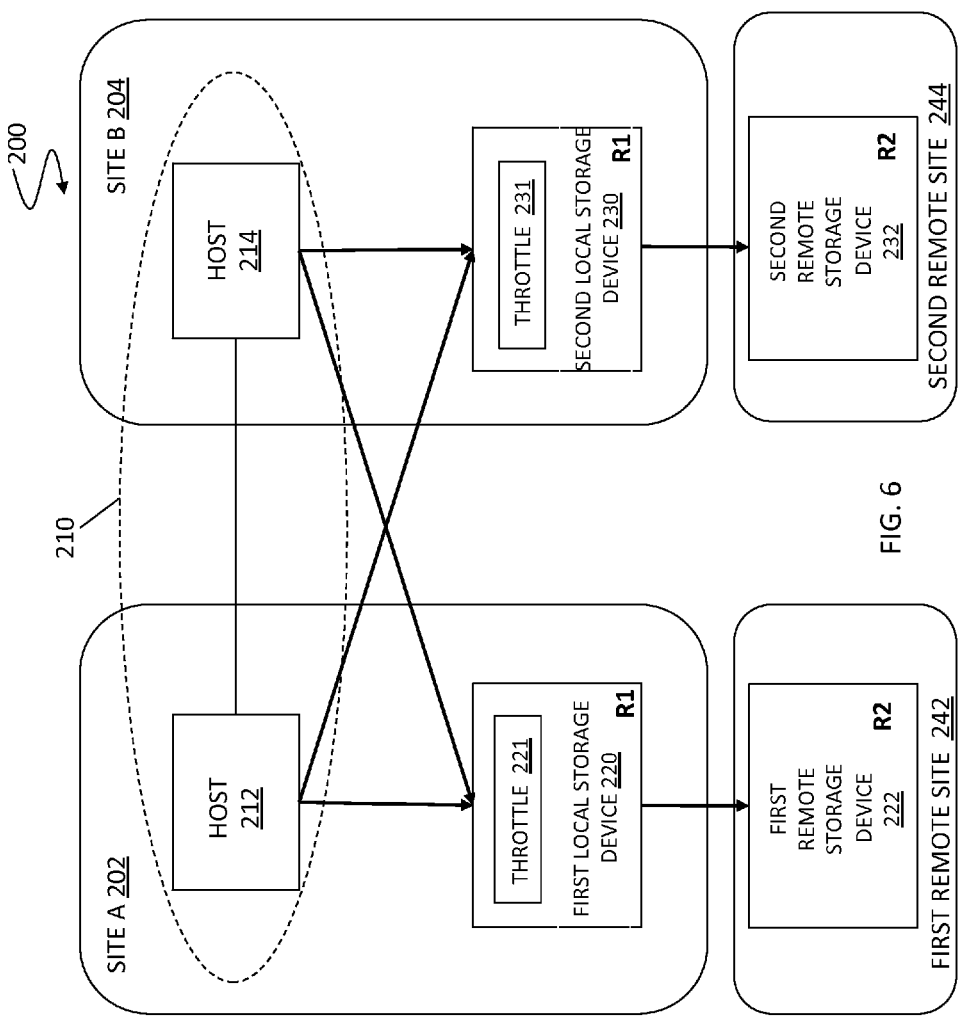
FIG. 6 is schematic illustration showing a multiple site replication system that may be used in accordance with an embodiment of the system described herein.

FIG. 6 is schematic illustration showing a multiple site replication system 200 that may be used according to an embodiment of the system described herein. The system 200 may include a Site A 202 and a Site B 204. The Site A 202 and Site B 204 may be different sites, but may or may not be located geographically distant from each other. A first local storage device 220 is provided at Site A 202 and a second local storage device is provided at Site B 204. A plurality of hosts 212, 214 may be coupled to the first local storage device 220 and the second local storage device 230 to conduct read and write operations from and to the local storage devices 220, 230. The system 200 provides for remote mirroring where multiple storage volumes, e.g., a first local storage device 220 and a second local storage device 230, may be active at the same time. In various embodiments, the plurality of hosts 212, 214 may be coupled to the storage devices 220, 230 directly and/or via a network, such as the Internet, an intranet and/or other suitable network connection. The hosts 212, 214 may be part of a cluster 210, which may be formed by a group of hosts and/or applications connected together, for example, via a local area network and/or other network.

A first remote site 242 may include a first remote storage device 222 (R2) that may be coupled via an asynchronous data transfer link to the first local storage device 220 (R1) on Site A 202. A second remote site 244 may include a second remote storage device 232 (R2) that is coupled via an asynchronous data transfer link to the second local storage device 230 (R1) on Site B 204. In connection with the system described herein, host-synchronous I/O requests from respective hosts 212, 214 of the cluster 210 may be given priority according to the system described herein. The storage device 220 may include a throttle device 221 to initiate a host-synchronous response time window after receipt of a host-synchronous I/O request at the storage device 220 and to throttle processing of non-host synchronous I/O requests. Similarly, the storage device 230 may include a throttle device 231 to initiate a host-synchronous response time window after receipt of a host-synchronous I/O request at the storage device 230 and to throttle processing of non-host synchronous I/O requests.

In an embodiment, any of the hosts 212, 214 may have priority over internal synchronous I/O requests of the system using the host-synchronous request time window described herein. In other embodiments, different of the host-synchronous I/O requests may have different priorities. For example, a host synchronous I/O request received at the first local storage device 220 from the host 212 may be given priority using the host-synchronous request time window over a synchronous I/O request received from the host 214. Accordingly, in an embodiment, the system described herein may provide for use of different host-synchronous request time window depending on the source of the synchronous I/O requests being from one or more particular hosts and/or host clusters.

It is noted that one or more storage devices discussed herein may include separate devices remotely located to provide multiple site replication for disaster recovery. In other embodiments, a common remote storage device may be used and/or each of the storage devices may act as remote storage devices for the other storage device, as further discussed elsewhere herein. It is further noted that each of the sites described herein may have more than one storage device, including possibly many storage devices. The storage devices may be separate devices, volumes, and/or portions thereof. The devices may include physical devices and/or logical volumes that are, for example, identified as Logical Unit Numbers (LUNs).

Figure 7:
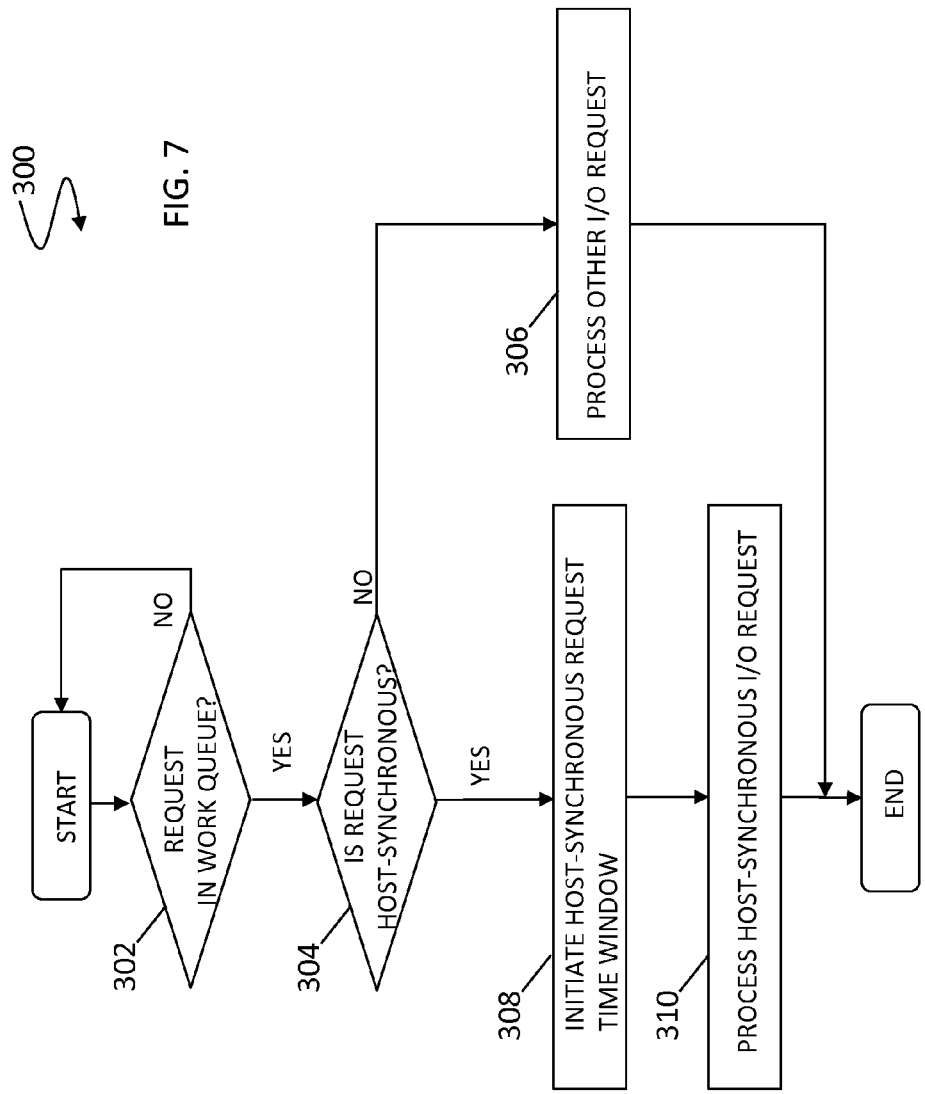
FIG. 7 is a flow diagram showing processing of system described herein in connection with initiating a host-synchronous response time window for an initial I/O request according to an embodiment of the system described herein.

FIG. 7 is a flow diagram 300 showing processing of system described herein in connection with initiating a host-synchronous response time window for an initial I/O request according to an embodiment of the system described herein. At an initial test step 302, the system described herein checks a work queue to determine whether an I/O request has been received and is awaiting processing. Processing iterates at the test step 302 until an I/O request is awaiting process in the work queue, thereupon, after the test step 302, processing proceeds to a test step 304 where it is determined whether the I/O request is a host-synchronous I/O request. If not, then processing proceeds to a step 306 where the non-host-synchronous I/O request, for example, an asynchronous I/O request and/or internal synchronous I/O request, as appropriate, is processed. After the step 306, processing is complete for the iteration of the processing begun in connection with the initial I/O request.

If, at the test step 306, it is determined that the received I/O request is a host-synchronous I/O request, then processing proceeds to a step 308 where a host-synchronous request time window is initiated. As discussed elsewhere herein, the host-synchronous request time window is a period within which it is expected (or considered likely) that another synchronous I/O request from the host may be received. In various embodiments, as discussed elsewhere herein, the length of the window may be fixed (e.g. 5 ms) and/or may be varied depending on network conditions, the host from which the initial I/O request is received, the type of I/O request, among other possible considerations, and may include being automatically set and/or be manually set by a user and/or administrator. After the step 308, processing proceeds to a step 310 where the host-synchronous I/O request is processed and/or otherwise serviced. After the step 310, processing is complete for the iteration of the processing begun in connection with the initial I/O request. It is noted that the order of steps 308 and 310 may be reversed in accordance with an embodiment of the system described herein.

Figure 8:
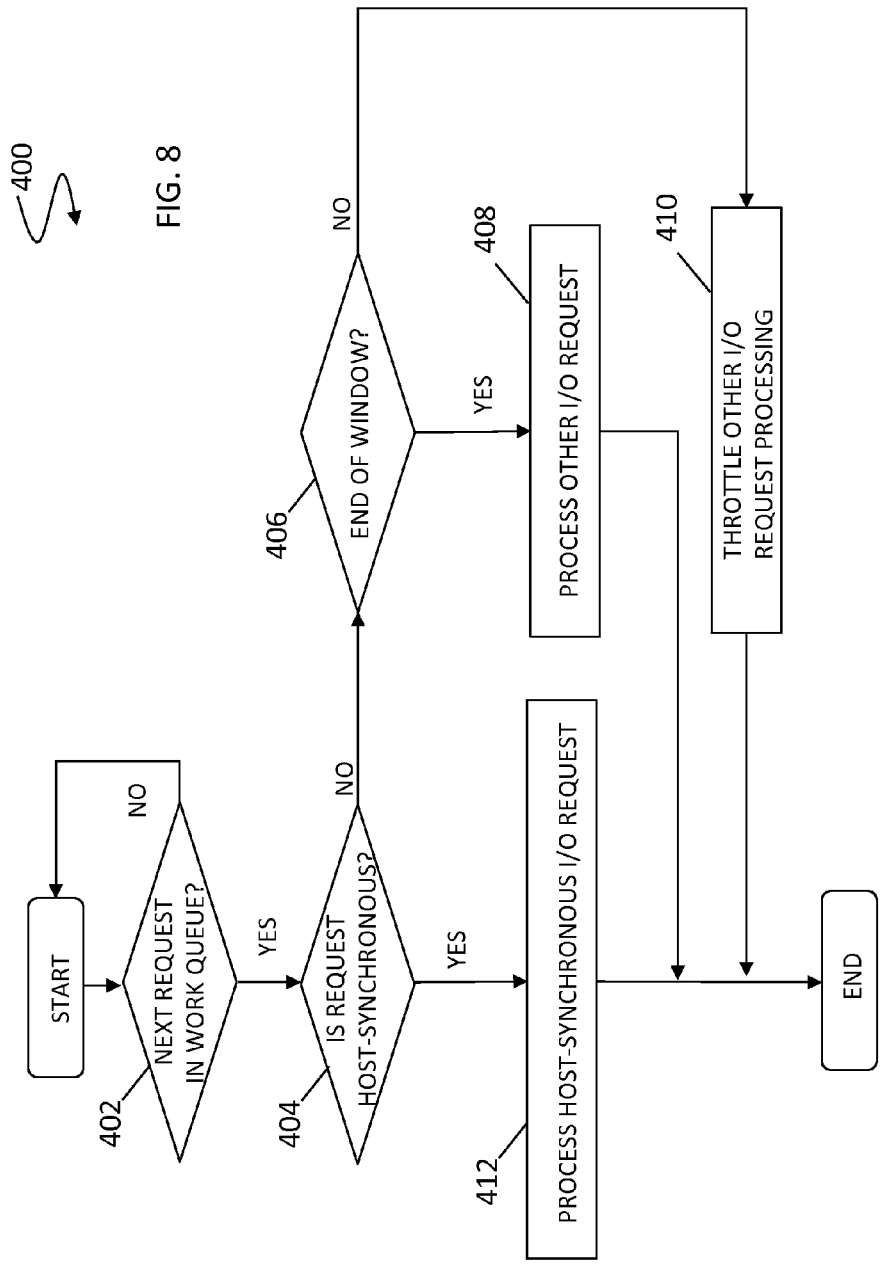
FIG. 8 is a flow diagram showing processing, following that of the flow diagram in FIG. 7, in connection with an iteration of processing of a subsequent I/O request according to an embodiment of the system described herein.

FIG. 8 is a flow diagram 400 showing processing, following that of the flow diagram 300, in connection with an iteration of processing of a subsequent I/O request according to an embodiment of the system described herein. At an initial test step 402, the system described herein checks a work queue to determine whether a next I/O request has been received and is awaiting processing. Processing iterates at the test step 402 until a next I/O request is awaiting process in the work queue, thereupon, after the test step 402, processing proceeds to a test step 404 where it is determined whether the I/O request is a host-synchronous I/O request. If the I/O request is not a host-synchronous I/O request then processing proceeds to a test step 406 where it is determined whether an end of the host-synchronous request window, initiated in the processing of flow diagram 300, has been reached. If the end of the window has been reached, then processing proceeds to a step 408 where the other (non-host-synchronous I/O request) is processed. After the step 408, processing is complete for the iteration of the processing in connection with the next I/O request of the work queue.

If, at the test step 406, it is determined that the end of the host-synchronous request time window has not been reached, then processing proceeds to a step 410 where processing of the other I/O request is throttled, for example, by a throttling device as further discussed elsewhere herein. After the step 410, processing is complete for the iteration of the processing in connection with the next I/O request of the work queue.

If, at the test step 404, it is determined that the I/O request received during the time window is a host-synchronous I/O request, then processing proceeds to a step 412 where the host-synchronous I/O request is processed and/or otherwise serviced. After the step 412, processing is complete for the iteration of the processing in connection with the next I/O request of the work queue.

Figure 9:
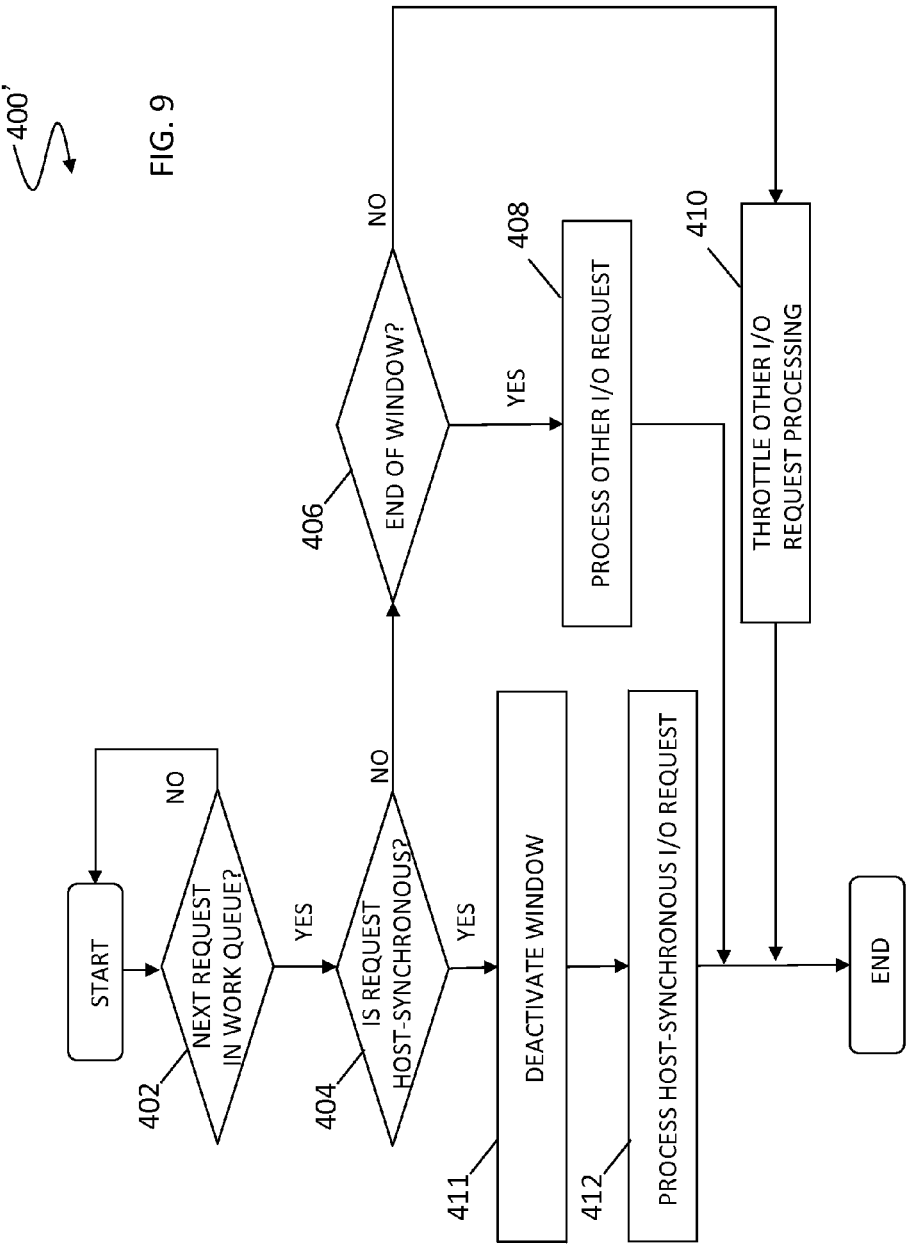
FIG. 9 is a flow diagram that is showing processing like that of flow diagram in FIG. 8, but with an additional processing step according to another embodiment of the system described herein.

FIG. 9 is a flow diagram 400' that is showing processing like that of flow diagram 400 but with an additional processing step according to another embodiment of the system described herein. Specifically, in the alternative flow processing 400', if, at the test step 404, it is determined that the I/O request received during the time window is a host-synchronous I/O request, then processing proceeds to a step 411 where the host-synchronous request time window is deactivated. That is, the system described herein may provide for a limited number of expected host synchronous I/O requests to be received during the host-synchronous request time window, after which the host synchronous request time window is automatically deactivated. After the step 411, processing proceeds to the step 412 where the host-synchronous I/O request is processed and/or otherwise serviced. After the step 412, processing is complete for the iteration of the processing in connection with the next I/O request of the work queue.

FIG. 10 is a flow diagram 300' showing processing like that of flow diagram 300 but with an additional processing step according to another embodiment of the system described herein. Specifically, the flow diagram 300' further includes a step 312, after the step 310 discussed in connection with the flow diagram 300, in which generation of non-host synchronous I/O requests is throttled. For example, the generation of internal synchronous I/O requests may be throttled (e.g., limited and/or prevented). It is noted that the embodiment of the flow diagram 300' may be performed in conjunction with the other embodiments of the flow diagrams 400, 400' discussed elsewhere herein in connection with throttling the processing/generation of non-host-synchronous I/O requests. After the step 312, processing is complete for the iteration of the processing in connection with the initial I/O request of the work queue.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include volatile and/or non-volatile memory, for example, a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of balancing response times of a system, comprising:
   receiving an initial first-type synchronous I/O request from a host;
   after receiving the initial first-type synchronous I/O request, initiating a time window;
   determining a length of the time window based on an assessment of an expected likelihood of receiving another first-type synchronous I/O request from the host;
   receiving at least one subsequent I/O request during the time window;
   determining a type of the at least one subsequent I/O request;
   in response to determining that the at least one subsequent I/O request is at least one other first-type synchronous I/O request received from the host during the time window, processing the at least one other first-type synchronous I/O request; and
   in response to determining that the at least one subsequent I/O request is a second-type request that is different from the at least one other first-type synchronous I/O request, throttling processing of the second-type request received during the time window until after the time window has expired.

2. The method according to claim 1, wherein throttling the processing of the second-type request includes limiting processing resources available to process the second-type request.

3. The method according to claim 1, wherein throttling the processing of the second-type request includes limiting generation of the second-type request.

4. The method according to claim 1, wherein the second-type request is a synchronous I/O request having a different priority than the first-type synchronous I/O request.

5. The method according to claim 1, wherein the assessment for the expected likelihood of receiving another first-type synchronous I/O request is based on at least one condition that includes at least one of: a network condition, a time of day, or an I/O request pattern.

6. The method according to claim 1, wherein the length of the time window is fixed by a user.

7. A non-transitory computer-readable medium storing software for balancing response times of a system, the software comprising:
   executable code that receives an initial first-type synchronous I/O request from a host;
   executable code that, after receiving the initial first-type synchronous I/O request, initiates a time window;
   executable code that determines a length of the time window based on an assessment of an expected likelihood of receiving another first-type synchronous I/O request from the host;
   executable code that receives at least one subsequent I/O request during the time window;
   executable code that determines a type of the at least one subsequent I/O request;
   executable code that, in response to determining that the at least one subsequent I/O request is at least one other first-type synchronous I/O request received from the host during the time window, processes the at least one other first-type synchronous I/O request; and
   executable code that, in response to determining that the at least one subsequent I/O request is a second-type request that is different from the at least one other first-type synchronous I/O request, throttles processing of the second-type request received during the time window until after the time window has expired.

8. The non-transitory computer-readable medium according to claim 7, wherein the executable code that throttles the processing of the second-type request includes executable code that limits processing resources available to process the second-type request.

9. The non-transitory computer-readable medium according to claim 7, wherein the executable code that throttles the processing of the second-type request includes executable code that limits generation of the second-type request.

10. The non-transitory computer-readable medium according to claim 7, wherein the second-type request is a synchronous I/O request having a different priority than the host-synchronous I/O request.

11. The non-transitory computer-readable medium according to claim 7, wherein the assessment for the expected likelihood of receiving another first-type synchronous I/O request is based on at least one condition that includes at least one of: a network condition, a time of day, or an I/O request pattern.

12. The non-transitory computer-readable medium according to claim 7, wherein the executable code that determines the length of the time window includes executable code that provides an interface that receives input by a user for the length of the time window.

13. A system for balancing response times of a storage system, comprising:
   at least one storage device that receives an initial first-type synchronous I/O request from a host and that receives at least one subsequent I/O request; and
   a throttle device that performs the following:
      after the initial first-type synchronous I/O request is received, initiates a time window;
      determines a length of the time window based on an assessment of an expected likelihood of receiving another first-type synchronous I/O request from the host;
      determines a type of the at least one subsequent I/O request;
      in response to determining that the at least one subsequent I/O request is at least one other first-type synchronous I/O request received from the host during the time window, enables processing of the at least one other first-type synchronous I/O request; and
      in response to determining that the at least one subsequent I/O request is a second-type request that is different from the at least one other first-type synchronous I/O request, throttles processing of the second-type request received during the time window until after the time window has expired.

14. The system according to claim 13, further comprising:
at least one remote storage device that is coupled to the at least one storage device and that provides data replication capability.

15. The system according to claim 13, wherein the second-type request is a synchronous I/O request having a different priority than the first-type synchronous I/O request, and wherein throttling the processing of the second-type request includes at least one of: (i) limiting processing resources available to process the second-type request, or (ii) limiting generation of the second-type request.

16. The system according to claim 13, wherein the second-type request is an asynchronous I/O request.

17. The system according to claim 13, wherein the assessment for the expected likelihood of receiving another first-type synchronous I/O request includes determining an average time between first-type synchronous I/O requests received over a prior period of time.

18. The method according to claim 1, wherein the second-type request is an asynchronous I/O request.

19. The method according to claim 1, wherein the assessment for the expected likelihood of receiving another first-type synchronous I/O request includes determining an average time between first-type synchronous I/O requests received over a prior period of time.

20. The non-transitory computer-readable medium according to claim 7, wherein the second-type request is an asynchronous I/O request.

21. The non-transitory computer-readable medium according to claim 7, wherein the assessment for the expected likelihood of receiving another first-type synchronous I/O request includes determining an average time between first-type synchronous I/O requests received over a prior period of time.

\* \* \* \* \*